(12) United States Patent
Romano

(10) Patent No.: US 11,463,841 B1
(45) Date of Patent: Oct. 4, 2022

(54) SYSTEM AND METHOD FOR MONITORING AND ENSURING STUDENT SAFETY

(71) Applicant: STUDENT ALLY, INC., Bristol, RI (US)

(72) Inventor: Alex Romano, Bristol, RI (US)

(73) Assignee: Student Ally, Inc., Bristol, RI (US)

( * ) Notice: Subject to any disclaimer, the term of this patent is extended or adjusted under 35 U.S.C. 154(b) by 0 days.

(21) Appl. No.: 16/932,932

(22) Filed: Jul. 20, 2020

Related U.S. Application Data

(60) Provisional application No. 62/876,041, filed on Jul. 19, 2019.

(51) Int. Cl.
| | |
|---|---|
| *H04W 4/029* | (2018.01) |
| *H04W 4/021* | (2018.01) |
| *H04W 4/90* | (2018.01) |
| *H04W 4/024* | (2018.01) |
| *H04W 4/12* | (2009.01) |
| *H04W 4/02* | (2018.01) |

(52) U.S. Cl.
CPC .......... *H04W 4/029* (2018.02); *H04W 4/021* (2013.01); *H04W 4/023* (2013.01); *H04W 4/024* (2018.02); *H04W 4/12* (2013.01); *H04W 4/90* (2018.02)

(58) Field of Classification Search
CPC ............................. H04W 4/029; H04W 4/027
See application file for complete search history.

(56) References Cited

U.S. PATENT DOCUMENTS

| | | | | |
|---|---|---|---|---|
| 9,620,007 | B2* | 4/2017 | Mieth | G08G 1/0133 |
| 2008/0125959 | A1* | 5/2008 | Doherty | H04L 67/52 |
| | | | | 707/999.107 |
| 2015/0185037 | A1* | 7/2015 | Horvitz | G01C 21/3492 |
| | | | | 701/533 |
| 2016/0371425 | A1* | 12/2016 | Tomkins | G06Q 30/0282 |
| 2019/0102840 | A1* | 4/2019 | Perl | G07C 5/02 |

* cited by examiner

*Primary Examiner* — Qutbuddin Ghulamali
(74) *Attorney, Agent, or Firm* — DeLio Peterson & Curcio LLC; Peter W. Peterson

(57) ABSTRACT

Computer-based systems and methods provide location, information and call tracking, and the reporting, evaluation and transmission of required information in event of emergencies or violations to students, which systems and methods are monitored and controlled by a centralized authority.

16 Claims, 5 Drawing Sheets

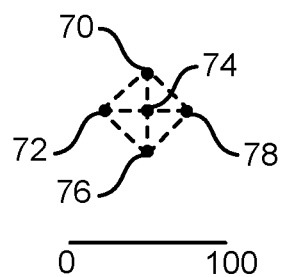
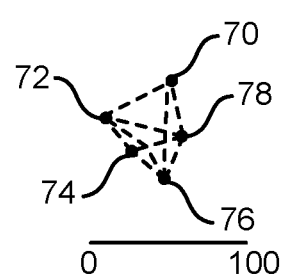
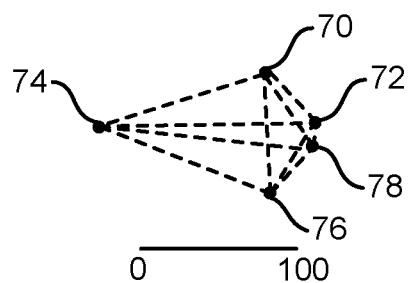
FIG. 9A    FIG. 9B    FIG. 9C
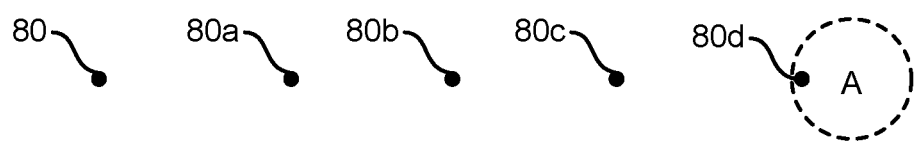
FIG. 10

SYSTEM AND METHOD FOR MONITORING AND ENSURING STUDENT SAFETY

BACKGROUND OF THE INVENTION

1. Field of the Invention

The present invention is directed to systems and methods for location and information tracking, and the reporting, evaluation and transmission of required information in event of emergencies or violations to students and other persons.

2. Description of Related Art

Schools are required to implement systems, rules, methods and procedures that ensure student safety, including safeguards against sexual harassment/violence and misconduct. Institution of such systems, rules, methods and procedures have varied among different schools, and student safety in general has not been adequately safeguarded. Problems have also included failing to take a proactive approach to student safety and to preserve or collect evidence after an incident in a manner that can be properly evaluated.

SUMMARY OF THE INVENTION

Bearing in mind the problems and deficiencies of the prior art, it is therefore an object of the present invention to provide an improved system and method for monitoring and assessing travel characteristics of a person that may send a notification to the person or a designated entity if the deviation is above a predetermined maximum.

It is another object of the present invention to provide an improved system and method for monitoring emergency situations of a person and sending a notification to a designated entity.

It is a further object of the present invention to provide an improved system and method for identifying and contacting persons to obtain recollection of time, events and locations relevant to an identified incident.

It is yet another object of the present invention to provide an improved system and method for locating persons separated from a group, and sending out notification concerning the separated person.

A further object of the present invention is to provide an improved system and method for determining arrival of a person at a designated location at time of day and sending notification concerning the person.

It is another object of the present invention to provide an improved system and method for determining quality of recollection of time, events and locations of a person by assessing via an algorithm deviation of the accuracy of the person's recollection of travel history compared to objective reports of the person's travel history.

Another object of the present invention is to provide improved systems and methods for location, information and call tracking, and the reporting and transmission of required information in event of emergencies or violations to students, to ensure student safety on or around campuses and in other locations.

It is a further object of the present invention to employ technology to take a proactive approach to student safety and to preserve and collect proper evidence after an incident, mitigates the effects of time latency in the identification of location and other collected information.

The above and other objects, which will be apparent to those skilled in the art, are achieved in the present invention which is directed to computer-based systems and methods for location, information and call tracking, and the reporting and transmission of required information in event of emergencies or violations to students, which systems and methods are monitored and controlled by a centralized authority.

In one aspect, the present invention is directed to a system and method of monitoring and assessing travel characteristics of a person initially comprising providing historic travel characteristics of a person comprising locations frequented, average travel speed, frequency of change of direction and patterns of travel activity at time of day. The method then includes establishing for the person a maximum desired degree of deviation from the historic travel characteristics of the person over a period of time; determining time of day of travel of the person; and receiving travel characteristics of the person over a predetermined period of time inclusive of time of day of travel of the person. The method further includes comparing the received travel characteristics of the person over the predetermined period of time with the historic travel characteristics of the person and determining degree of deviation of the received travel characteristics of the person over the predetermined period of time from the historic travel characteristics of the person. If the received travel characteristics of the person over the predetermined period of time is over the maximum established degree of deviation from the historic travel characteristics of the person, the method includes sending a notification to the person or a designated entity. The maximum desired degree of deviation of travel characteristics of the person over a period of time based is established for the person based on parameters selected from the group consisting of time of day, geographical location and distance from frequented locations If the received travel characteristics of the person over the predetermined period of time is not over the maximum established degree of deviation from the historic travel characteristics of the person, the method may further include receiving travel characteristics of the person over an additional period of time and continuing reception of travel characteristics of the person over an additional period of time until the person reaches a frequented location.

If the received travel characteristics of the person over the predetermined period of time is over the maximum established degree of deviation from the historic travel characteristics of the person, the method may further include sending to the person a recommended geographical path of travel to a frequented location.

This aspect of the invention is also directed to a system for monitoring and assessing travel characteristics of a person comprising a computing device at a central location or remotely at the person containing a computer readable medium having software adapted to perform the aforementioned method steps.

In another aspect, the present invention is directed to a method of monitoring emergency situations of a person comprising establishing for the person a key emergency phrase, continually receiving audio input from a person's mobile device over a predetermined period of time, monitoring the audio input of the person for words spoken by the person and determining if the person speaks the key emergency phrase. If the person speaks the key emergency phrase, the method includes recording by the device audio and/or video near the person along with time and location data of the person, and sending a notification to a designated entity.

This method may further include encrypting and storing the recorded audio and/or video along with time and location data in a central location with an encryption normally inaccessible to an administrator of the central location, providing by the person to an authorized administrator of the central location a code for decryption of the recorded audio and/or video, time and location data stored in the central location, and retrieving the recorded audio and/or video along with time and location data by the administrator of the central location if there is a dispute over the student's activities at the time the emergency phrase was spoken.

This aspect of the invention is also directed to a system for monitoring emergency situations of a person comprising a computing device at a central location or remotely at the person containing a computer readable medium having software adapted to perform the aforementioned method steps.

In a further aspect the present invention is directed to a method of determining quality of recollection of time, events and locations of a person comprising receiving a report by a person of recollection of travel history comprising locations frequented, location characteristics and events at time of day; determining objective travel history information of the person selected from the group consisting of objective reports of locations frequented, location characteristics and events at time of day; and establishing for the person a degree of deviation of recollection of travel history by comparing parameters of the person's report of recollection of travel history with parameters of the objective reports of the travel history of the person. The method further includes identifying a maximum degree of deviation between the parameters of person's report of recollection of travel history with the parameters of objective reports of the travel history of the person; and, using the maximum degree of deviation identified, determining a deviation assessment of the accuracy of the person's recollection of travel history compared to the objective reports of the person's travel history.

This method may further include creating a first map of specific parameters in the report of the person's recollection of travel history, creating a second map of specific: parameters in the objective reports of the person's travel history, and comparing the specific parameters in the first map with comparable specific parameters in the second map to determine degree of deviation of each specific parameter. The method then includes using the determined degree of deviation of each specific parameter to determine the deviation assessment.

This method may also include assigning a deviation assessment degree of truthfulness or recollection of each specific parameter and/or further including determining a general deviation assessment based on all of the determined degrees of deviation of each specific parameter.

The degree of deviation of each specific parameter may be determined by comparing the specific parameter in the first map with a comparable specific parameter in the second map, and assigning a deviation based on accuracy of the person's claim of recollection or claim of lack of recognition compared to the specific parameter in the objective reports of the person's travel history in the second map. The method may further including evaluating degree of deviation of specific parameters based on accuracy of the person's claim of adequate or good recollection compared to the specific parameter in the objective reports of the person's travel history in the second map, and separately evaluating degree of deviation of specific parameters based on accuracy of the person's claim of lack of recollection compared to the specific parameter in the objective reports of the person's travel history in the second map.

The degree of deviation of each specific parameter may be additionally determined by applying a weighting factor based on significance of time, events and/or locations in the person's recollection of travel history. The degree of deviation of each specific parameter may be reduced to a numerical value to determine degree of deviation.

The method may further include collecting an additional report of recollection of travel history by the person regarding the parameter of maximum deviation from the objective reports of the travel history of the person.

This aspect of the invention is also directed to a system for determining quality of recollection of travel of a person comprising a computing device at a central location or remotely at the person containing a computer readable medium having software adapted to perform the aforementioned method steps.

Yet another aspect the present invention is directed to a method of obtaining recollection of time, events and locations of a person comprising receiving historic travel characteristics of a plurality of people comprising identity, locations frequented and patterns of travel activity at time of day of each person in the plurality, and uploading and storing separately the historic travel characteristics of each person in the plurality in a central location. The method further includes receiving a report by an administrator of the central location from a reporting person of an incident at a location and time of day, and determining from historic travel characteristics in the central location whether any historic travel characteristics of the plurality of people were near the incident location and time of day of the reporting person. The method then includes determining identity of the person whose historic travel characteristics were near the incident location and time of day of the reporting person, and contacting the identified person whose historic travel characteristics were near the incident location and time of day of the reporting person by the administrator to obtain recollection of time, events and locations of by the identified person relevant to the incident reported by the second person.

This aspect of the invention is also directed to a system for obtaining recollection of time, events and locations of a person comprising a computing device at a central location or remotely at the person containing a computer readable medium having software adapted to perform the aforementioned method steps.

A further aspect of the invention is directed to a method of locating persons separated from a group comprising providing a group comprising a plurality of people having mobile devices having capability of determining travel characteristics comprising identity, location and time of day of the person having the mobile device, and linking the mobile devices of each of the plurality of people in the group. The method then includes establishing a maximum separation distance of a mobile device from the mobile devices of each of the plurality of people in the group, receiving current travel characteristics at each mobile device of the plurality of people in the group comprising location and time of day of each person in the plurality, and measuring separation distance of each mobile devices from the mobile devices of each of the plurality of people in the group. If the separation distance of any mobile device of the plurality of people in the group exceeds the maximum separation distance from any other mobile device of the plurality of people in the group, the method further includes sending a notification to the mobile devices of the identity and location of the person having the mobile device exceeding the maximum separation distance.

Another aspect of the invention is directed to a method of determining arrival of a person at a designated location at time of day comprising providing a group comprising a plurality of people having mobile devices having capability of determining travel characteristics comprising identity, location and time of day of the person having the mobile device, and providing for each person in the group a designated entity comprising the identity of at least one other person in the group and optionally a third party. The method then includes establishing boundaries of a selected designated location and time of day of expected arrival of a first person in the group, and receiving current travel characteristics of the first person's mobile device comprising location and time of day. The method then includes comparing the received current travel characteristics of the first person with the boundaries of the selected designated location and time of day of expected arrival of the first person and, if the received current travel characteristics of the person is outside of the boundaries of the selected designated location and time of day of expected arrival of the first person, sending a notification from the first person to the designated entity. The notification may consist of the travel history and current location of the first person.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 9*a*, 9*b* and 9*c* are sequential diagrams of the relative positions and separation of the individuals in a group traveling through sequential locations for use with one aspect of the method and system of the present invention.

FIG. 10 is a diagram of the sequential locations of a student toward an established boundary of a location expected arrival for use with one aspect of the method and system of the present invention.

DESCRIPTION OF THE EMBODIMENTS

In describing the embodiment(s) of the present invention, reference will be made herein to FIGS. 1-10 of the drawings in which like numerals refer to like features of the invention.

For purposes of the subject description, the word "embodiment" or "exemplary" is used to mean serving as an example, instance or illustration. Any aspect or design described herein as an "exemplary embodiment" is not necessarily intended to be construed as preferred or advantageous over other aspects or design. Rather, the use of the word "exemplary embodiment" is merely intended to present concepts in a concrete fashion.

The systems and methods of the present invention are implemented by computer-based software and may include one or more of the capabilities described herein. The system in some aspects is embodied in a computing device located at a central location, which may be accessed via a web-based platform, and in some aspects may be in the form of a software application downloaded into a mobile or smart phone, smart watch, smart bracelet or other mobile computing device carried by the person, which may be operated as a stand-alone system or be linked to the central location. Entry and viewing of information on the central or remote computing device may be via a graphical user interface ("GUI") on a screen of the device. For the embodiments described herein, a student is exemplified, but the systems and methods may also be used for other types of persons and in other situations. In the case of student use on or around the campus of a college or university or at other locations frequented by students, the methods and systems of the present invention may be used to further student safety and to assist students and administration in the investigation and evaluation of violations involving sexual harassment/violence and other misconduct.

Figure 1:
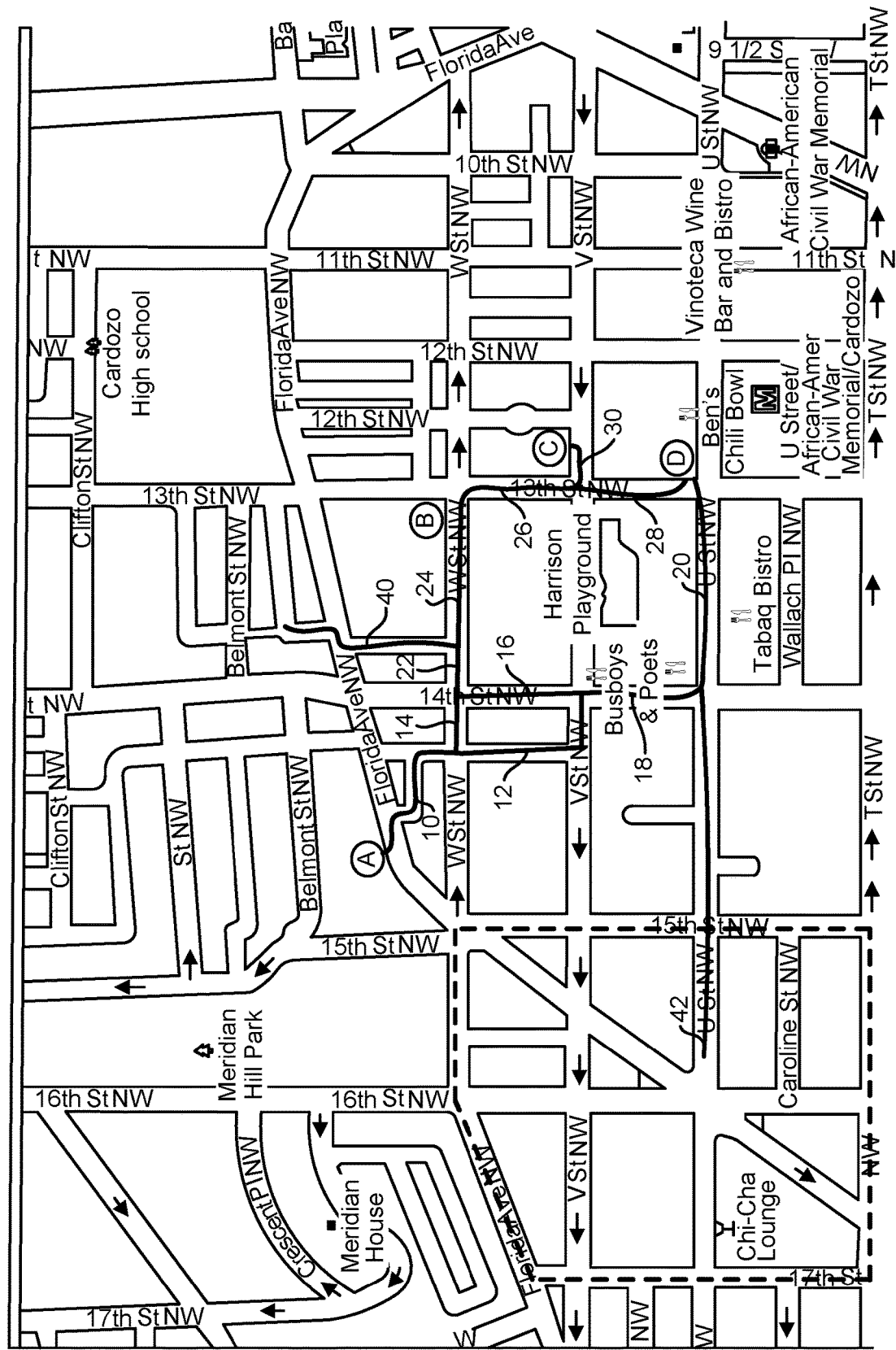
FIG. 1 is a diagram of an exemplary street map depicting frequented locations, a student's travel activity and travel paths and identified regions for use with one aspect of the method and system of the present invention.
Figure 2:
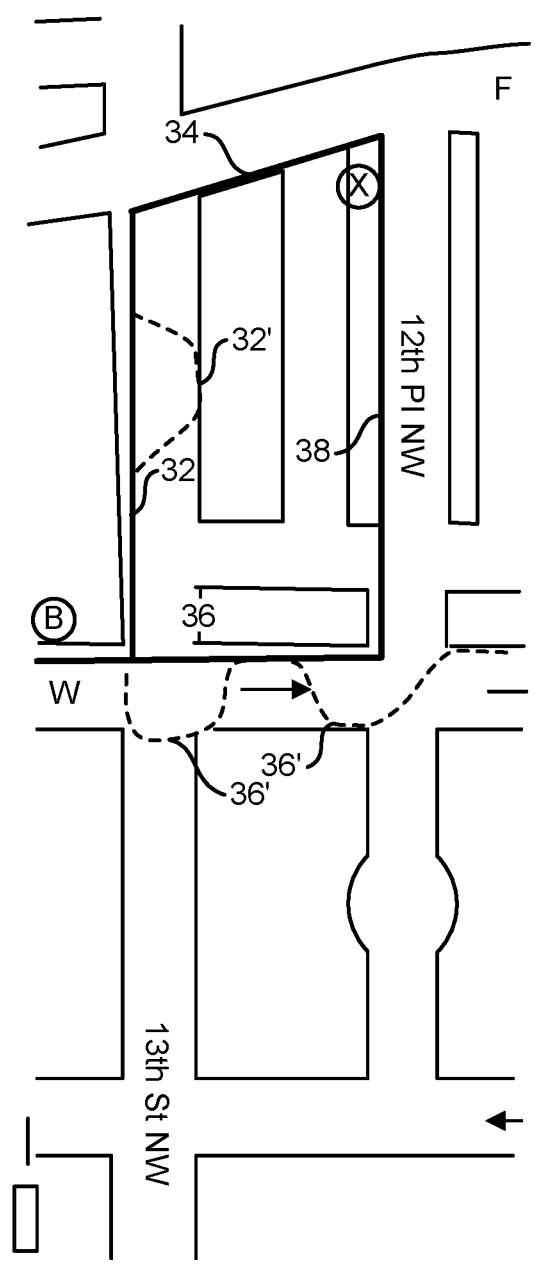
FIG. 2 is a close-up of the street map of FIG. 1, showing locations and travel paths.

The present invention provides in one aspect a method and system for user behavioral analytics and safety assessments utilizing historic travel characteristics provided for a person, e.g., locations frequented, average travel speed, frequency of change of direction and/or patterns of travel activity at time of day. A person using this method and system, for example, a student, will activate the system on their mobile device which then captures and analyzes their GPS data, including typical walking speed, patterns of activity, locations they're frequenting, e.g. tavern and restaurants, geographical locations the student has traveled to before (or have not traveled to before), and generates notifications to the student advising them of potential risks. An exemplary street map is shown in FIG. 1 depicting frequented locations home A, friend D and taverns B and C. The student's travel activity may comprise taking any one of travel paths 10, 12, 14, 16, 18, 20, 22, 24, 26, 28 and/or 30, and walk or run at various speeds, at various times of the day between these locations. In addition to GPS data for speed and direction, gyroscopic and dynamic data from the mobile device's accelerometer or other sensor may be recorded, such as smooth or jerky movement as a travel characteristic. The student's travel activity between these locations, including direction of travel and changes in direction, as well as additional locations which become frequented, is recorded and is continually updated to create the historic travel characteristics of the student. Referring to FIG. 1, the student traveling from home A to friend D may travel via path segments 10-12-18-20, 10-14-16-18-20, or 10-14-22-24-26-28. Likewise, the student traveling from home A to tavern B may normally travel via path segments 10-14-22-24. The student's historic travel characteristics may be recorded and stored on the mobile device and, if granted permission by the student, uploaded and encrypted and stored in a central location, as will be discussed further below.

Based on the student's historic travel characteristics, a maximum desired degree of deviation from the historic travel characteristics over a period of time is established for the student by the system on the student's own mobile device or in the central location. This may be done by an algorithm or set of rules establishing percentage deviations of each of the parameters of the student's historic travel characteristics, for example, 5% or 50% under or 200% over the parameter, or different fixed distances from frequented locations. The degree of deviation may be assigned a numerical value. The maximum degree of deviation may be adjusted according to time of day, geographical location and distance from frequented locations, or other desired parameter.

The system also may alert the student to the most direct or the safest travel path between locations, for example, by a request by the student to the system for a safe path home from a frequented location, such as tavern C or D. In some cases the safest travel path is not the most direct path, which the system will assess according additional algorithms incorporating third party reports of characteristics such as street lights, population and number of residences, volume of vehicular travel, crime reports, and the like. The system then highlights the path home on a map displayed on the device screen via the path segments 10 through 30 shown in FIG. 1.

As the student travels, the newly received travel activity and characteristics are compared by the system on the student's mobile device or in the central location and the degree of deviation from the historic travel characteristics, if any, is compared to maximum desired degree of deviation as previously established. For example, as depicted in a close-up street map of FIG. 2, the system may detect that the student has left tavern B at 2:00 am, and is proceeding to travel via segments 32-34 or 36-38 to another location, for example location X, which may or may not be a frequented location recognized by the system. The system may also detect that the student is walking at a pace significantly slower than the student typically walks, and is not walking towards home location A, and may also detect unsteady or non-linear walking along paths 32' or 36' or 36".

Based on the time of day and the direction of travel, which is not toward the student's home A, the algorithm employed by the system may assess that the student may have exceeded the maximum desired degree of deviation from the historic travel characteristics because of multiple pauses, walking in a staccato, variable speed fashion or in a non-linear path, or may be traveling in a direction away from any known location. This is a sign that the student may be inebriated or may otherwise be having trouble or needing help walking home. The system may then send the student an audio or video prompt via the mobile device's speakers or screen, with a notification that it appears the student may be in need of assistance and send to the student's device a recommended path of travel or home, as a safe path home feature, or to another frequented location. The system may simply notify the student of the deviation with an optional warning to return to the safe path within a specified time, or may offer the student a choice of emergency alert functions such as a call to a designated entity such as one or more of the government authorities via a 911 call, private security authorities via a call to campus security, or the student's pre-stored personal emergency contacts. Whether or not the system detects a maximum deviation, the student may designate a contact to be sent real-time location information of the student for monitoring the student's progress. The system may also offer the student the ability to launch other applications on the mobile device such as rideshare service to get a safe ride back, or if the school has a shuttle service, offer the student information on how to get to the shuttle.

If the system determines via the algorithm that the travel characteristics of the person are not over the maximum established degree of deviation from the person's historic travel characteristics, it will continue receiving travel characteristics of the person over an additional period of time until the maximum desired degree of deviation is triggered, or until the person reaches a frequented location.

Because of the storage and reference to historic travel characteristics, the system may recognize that the student often goes walking, or goes to the tavern often, and the system can alert the student to and recommend active safety or other functions for the student to use to improve safety. The system may also recognize the student's use of active safety features, and assess historic travel characteristics to recommend features. For example, the system may recognize that the student had used the safe path home feature when walking back from a tavern or other location on, for example, five prior occasions. On the sixth occasion or return from that same location, the system may recognize that the student is commencing to walk home on the same path the student had previously activated the safe path home feature, and the system may prompt the student and ask if the same safe path home used previously should be activated. A similar needs analysis would be used to recommend any of the other active safety functions.

The system may also access and cross-reference the student's current location and behavioral analytics as described above with underlying data on crime statistics for that location. For example, in FIG. 1 if the system detects excess deviations in walking characteristics associated with suspected inebriation (as described above) and further recognizes that the student is in an area that they have not been to before, such as path 40 in FIG. 1, the system may adopt a standard threshold of maximum desired degree of deviation from the historic travel characteristics for notifying the student about risk. However, if the time of day is after dark and the student's location is in an area known for criminal activity at that time of night, such as on path 42 in the region bounded by dashed lines, the system may notify and warn the student about these risks, and advise the student to activate one or more of the safety features of the system, or to notify a friend about their activities. The system may also detect and assess when the student is in a new area in which the student has not traveled, and notify and provide the student with an update on the crime data and risks for that area, and assess the student's overall travel characteristics to generate recommendations on how to stay safe and whether any safety features may be useful.

The GPS and other historic travel characteristics data may be uploaded to the system's server at the central location and stored in an encrypted format for a limited period of time, say one year, and may only be released to the system's administrator in the context of an ongoing claim involving a dispute over, relating to, or involving the student's activities at the time the student's historic or subsequent travel characteristics were recorded. The decryption may be accomplished by the administrator or by the student as described elsewhere herein. In any event, decryption must always be done with the student's approval, whether to release information for a specific claim or incident, or to allow the accessibility of information due to their participation in the neighborhood watch program, as described further below.

The system as embodied in the student's mobile device may also be set to an audio-enabled alert mode which constantly listen to and detects key phrases, and initiates an emergency alert to their pre-stored personal emergency contacts by speaking a key phrase aloud while this function is enabled. For example, the student may activate this feature when the student enters another student's dorm room at night. If the other student begins to get aggressive or tries to assault the student, the student can speak the activation phrase and the application will begin recording audio and video along with time and location data, which may be uploaded to the system's server and stored in an encrypted format in the same manner as the historic GPS data and other travel characteristics. This audio/video recording may be stored for a limited period of time, and again only be released to the system's administrator for an ongoing claim involving a dispute over the student's activities at the time the emergency phrase was uttered—similar to standards for release of the GPS data and other travel characteristics. This function may also send the emergency alert as described above to one or more of the government or private security authorities or student's pre-stored personal emergency contacts.

The system has the ability to assess prior behaviors and compare/contrast those with the behavioral patterns during the time of an event using the pre-established maximum desired degree of deviation from the historic characteristics and other data of the student. The determined deviation(s) enable the system to make data-driven assumptions about and assessments of sobriety, coordination, and behavioral patterns. The sobriety assessments include not only GPS location data for speed, direction, etc., but also gyroscopic and dynamic data from the phone, since jerky movement could indicate lack of sobriety. In the event that the student's mobile device is a smartwatch or bracelet with an integrated heartrate monitor and temperature sensor, this biometric data may also be received, recorded and used to determine deviations that may assess sobriety, nervousness, pain, fear, or the like. The system may compare and contrast this data with historic data to assess the student's physical state at the time of the incident. By cross-referencing the specific timeframe at issue with the historic data, the system will generate an assessment as to the state of the reporting student during the relevant time period.

The system of the present invention may also determine quality of recollection of a person in the event that there is a need to investigate or recreate the person's earlier travel history. Again, in the case of a student, the system at a central location may receive input of the student's recollection of the student's travel history such as location, location characteristics and/or events at time of day. Fewer or more parameters of recollection may be used to establish the time, event or location used in the investigation. For example, the student may recall that at a certain date and time the student was at a particular location and describe identifying characteristics of the location, and at some earlier and/or subsequent time the student was at a different location with identifying characteristics. Based on this information other student travel history may be generated such as travel speed between locations. The system may then also access and receive from third party databases and other sources objective travel history information of the person that may be available of the same type of information and data, such as confirmation of the addresses of the locations and the identifying characteristics, videos or photos from cameras at or near the identified locations, and the ability to travel between locations in the times recalled by the student.

Based on the parameters of these two or more sets of information, the system algorithm establishes the degree of deviation of between the parameters of sets of data, i.e., the person's report of recollection of travel history and the characteristic elements, data or other parameters identified in the third-party or objective reports. From this the system may then identifying a maximum degree of deviation between the parameters of person's report of recollection of travel history and the parameters of third-party or objective reports. Using the maximum degree of deviation identified, the system then makes a deviation assessment of the accuracy of the person's recollection of travel history and events compared to the objective reports of the person's travel history and events.

The system may generate a narrative map from the student's report. This map may be a linear narrative map oriented vertically and correlate chronologically with the top being the beginning of the narrative and the bottom being the end. All assertions and other recollections made by the student may be mapped on the chart. Assertions and other recollections with specific information (e.g., "a red house at corner of Eddy St.") will be weighted more heavily than vague assertions (e.g. "a house party"). The system will then overlay on the data of the student's recollections additional objective third-party data generated such as GPS data of locations, photos and videos of identifying characteristics, street cameras, credit card receipts of the student showing quantities of drinks bought, key fob data from student entry into campus dorms and other locations, and the like to provide any hard data points that can be obtained from objective third-party sources. If pertinent and authorized, hospitals may be sent authorizations to obtain relevant medical records, and FOIA requests are generated for police reports/public records. A further objective source is the student's own travel history previously recorded and stored. Mapping of these third-party data points and information is made in the same vertical chronological fashion as the student's recalled data. As each point or parameter deviates from the narrative, the system assigns a deviation assessment. For example, the third-party confirmation that it was a brown house as the corner of Eddy St. would be established as a relatively minor deviation while the objective data determination that it was a house on the other side of town would be established as a major deviation. The degree of deviation may be assigned a numerical value.

Figure 3:
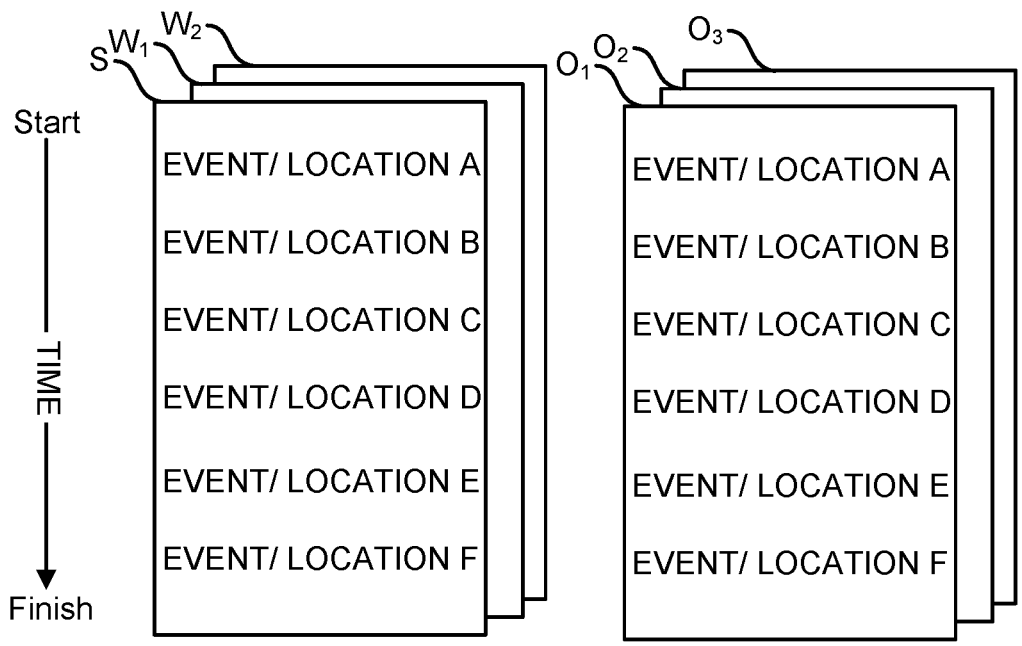
FIG. 3 is a depiction of a series of linear maps showing chronologically recorded information and facts of times, events and locations, in accordance with the present invention.
Figure 4:
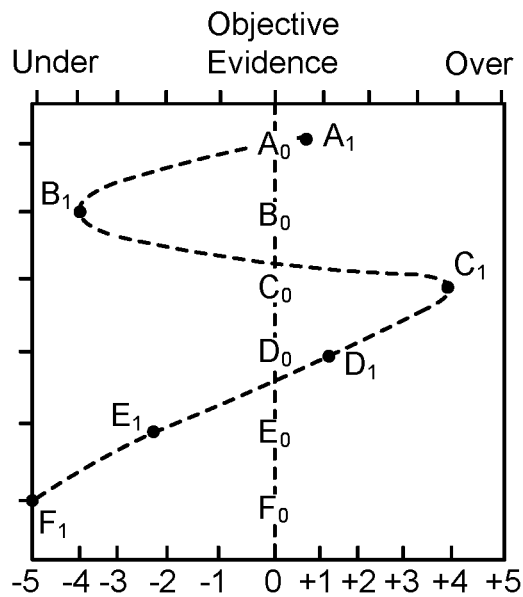
FIG. 4 is a depiction of a series of linear maps showing the accuracy of recollection of an individual subject or witness against objective data gathered, scored by degree of recollection and accuracy, in accordance with the present invention.

Examples of such linear mapping are shown in FIGS. 3 and 4. A student who is the subject of an investigation is asked to recall information and facts of times, events and locations from the start time to the time that the events are finished. The facts as recalled are recorded chronologically in FIG. 3 as Event/location A, Event/location B, and so until the final Event/location F, for example. The same is done for the recollection of the same times and Event/locations for each witness $W_1$, $W_2$, and so on. Once the times, events and locations are identified, objective third-party data is sought, such as that described, along with any objective data that might be obtained from the student's prior travel history or characteristics, such as locations visited or travel time between locations, which are then logged as corresponding Event/location A and so on, for each objective data source $O_1$, $O_2$, $O_3$ and so on. FIG. 4 shows the mapping of the accuracy of recollection an individual subject or witness against objective data gathered. The vertical centerline represents the objective data for each event/location $A_0$, $B_0$ and the like through the final event $F_0$, as compiled from the collection of objective data sources $O_1$, $O_2$, $O_3$ and the like in FIG. 3. The recollection of the first subject or witness to the investigation is scored according to the algorithm employed by degree of recollection and accuracy. In the exemplary algorithm used in FIG. 4, if the recollection of a subject or witness of an Event/location corresponds to the objective data, it is scored as 0. If a subject or witness claims to have an adequate or good recollection but the recollection of an Event/location is completely different or wrong compared to the objective data, it is scored as +5 on the "Over" or right side of the map. If the subject or witness claims to have little recollection of an Event/location B and it is far from the objective data, it is scored as a −5 on the "Under" or left side of the map.

For example, if a subject or witness claims to have a recollections Ai and Da of information on Event/location A and D, respectively, and it is close to the objective data, might be scored as a +0.5 and +1, respectively, on the scale. On the other hand, if the subject or witness claims to have an adequate or good recollection Ci of information on Event/location C and it is very different or wrong from the objective data, it might be scored as a +4, and if the subject or witness claims to have less recollection of Event/location E and it somewhat disagrees with the objective data, it might be scored as −2. Finally, if the same subject or witness claims to have little, incomplete, vague, or only generic recollections Bi and Fi of information on Event/locations B and F and they are far from the objective data, they might be scored as a −4 and −5, respectively. Other algorithms or rules may be employed.

Figures 5, 6, 7:
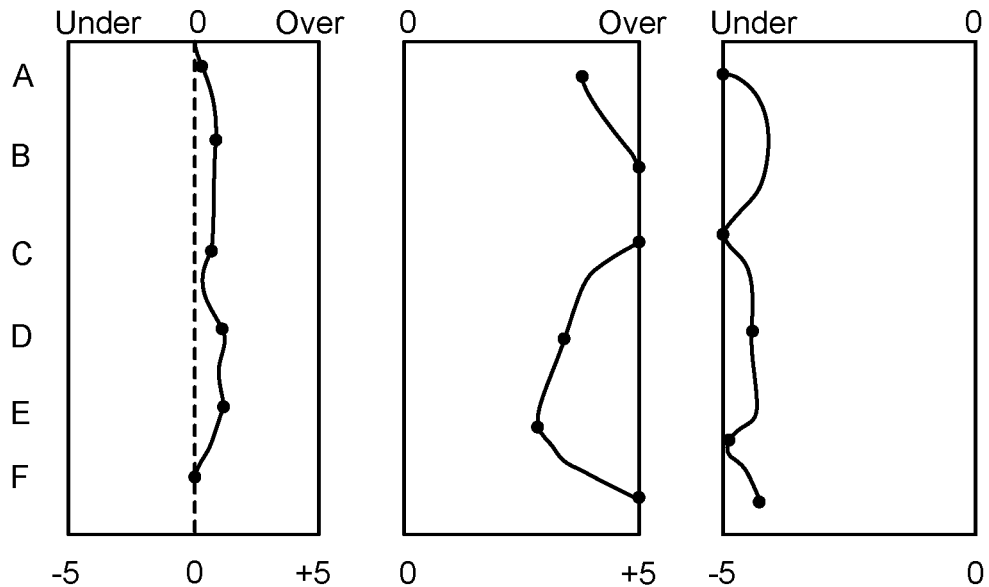
FIG. 5 is a depiction of a linear map based on the type of FIG. 4 showing a relatively minor deviation from the 0 point of the objective data assessing a subject or witness as being relatively truthful.
FIG. 6 is a depiction of a linear map based on the type of FIG. 4 showing a relatively large deviation on the Over side assessing a subject or witness as being not truthful about times, events and locations.
FIG. 7 is a depiction of a linear map based on the type of FIG. 4 showing a relatively large deviation on the Under side assessing a subject or witness as having little or no recollection about times, events and locations.

Once the entire narrative for each subject S or witness W is mapped, the system will generate a deviation assessment regarding the student's credibility and quality of recollection. The linear map may be used as illustrated in FIG. 4 as the deviation assessment, where in the example shown in FIG. 5 a relatively minor deviation from the 0 point of the objective data assesses a subject or witness as being relatively truthful. On the other hand, the Over and Under data may be separately assessed for each subject or witness to determine that the subject or witness has a large deviation on the Over side and is not truthful about times, events and locations (FIG. 6) or that the subject or witness has a large deviation on the Under side and has little or no recollection about times, events and locations (FIG. 7). Additionally, the significance of time, events and locations may be weighted on a scale, and that weighting may be used to multiply the Over/Under scores to determine degree of deviation. Either the map lines themselves as shown in FIGS. 5-7 may be used as the deviation assessment, or each, may be reduced to an average numerical value to determine degree of deviation. A general deviation assessment may be determined based on all of the determined degrees of deviation of each specific parameter of time, event and location, or the deviation assessment may be based on selected parameters of fewer than all times, events and locations.

The assessment(s) as described above may be used in the investigation to assess the investigation subject and witnesses and priorities. Initial determinations may be made that a subject or witness is truthful or untruthful, or has no recollection of relevant times, events and locations and will not be contacted further. The deviation assessment(s) may be used as well as by the system later to generate follow-up questions and interrogatories for further investigation for parameters of maximum deviation to generate an additional report by the student or witness of travel history or other information. For example, if the student reports that their assailant has known them for "a long time" or they were at "a frat house" or "a big house" the system will prompt them to provide a more clarifying assertion. In addition, the system may recognize sobriety issues based on GPS and other data from the student's travel history and travel characteristics, and may ask the student about alcohol consumption if the student didn't identify any alcohol consumption in their original report.

Such prompts for further information may be sent directly to and appear on the student's the mobile device, if the student is reporting an incident through the application, or may appear on a computer screen of an administrator if the student reports to the system's call center or to a school official, as the information is being entered by the administrator.

Other additional questions and interrogatories to follow up with the reporting student may be selected based on the deviation assessment without further intervention or selection by the system administrator(s). The system may generate a list of an additional number of written interrogatories to be sent to the student for formal response, generated from a master list of hundreds or thousands of questions from prior cases. The system chooses which interrogatory questions to select based on its analysis of case reports in other matters, the assessment of what questions were dispositive in those matters, which generated additional relevant evidence, and the like, using the system's adaptive learning tools.

In some cases the student may report the date of the incident, a number of locations involved in the incident, and perhaps other people involved in the relevant events. The system uses this information in order to review the student's GPS location history to establish the exact date and time when the event in question occurred. The system may cross-reference known data points and discover them within the GPS location history. The system may use the recalled date of the incident as a starting point and work outwards from this date. In this way, a student might recall or assert that the event happened one month ago, when the event actually happened two months ago. The system may identify the locations and parties and dates to find the relevant GPS location data points within the GPS mapping history. The system may then establish the particular and accurate date and time of the incident.

Once the system has discovered and established the specific date of the incident, auto-data point recognition may be run to assess the student's movements and identify the exact time they walked past security cameras, walked in or out of dorms or other locked facilities, entered or exited a bar or restaurant, and the like. The system may generate a time-stamped list of each data point and use that list to generate requests for information. Automatic requests for any information contained within the school's key fob or campus security camera system may be automatically sent directly to the school's administrator.

The method and system of the present invention permits identification of relevant witnesses by the student so that system may generate advisory notifications that are sent to the witnesses via the system software on students' mobile devices, informing them of the claim, their identification, their rights, the procedures, and the like. The method and system also permits identification of the accused student and generation of advisory video, audio, and/or text-based notifications to be sent to the accused student through the system software advising them of their rights, how the process works, how they can submit data in their defense, how to identify witnesses, and the like. Both the accused student and witnesses may input additional information via the system software on the students' mobile devices by submitting photos, videos, social media posts, as well as providing authorizations for medical records, credit card records, cell phone records, and other information.

The system may use an optional method by which students may volunteer to report their travel history and characteristics to be available as possible witnesses for incidents reported by other students. This method facilitates obtaining recollection of time, events and locations of a person having relevant information of an incident. The system as operated from the central location may receive historic travel characteristics of a plurality of people volunteering such information, such as one or more of identity, locations frequented and patterns of travel activity at time of day of each person in the plurality of volunteers. Students may be advised that they can elect to participate in a neighborhood watch program, by which the student's GPS data is stored on the primary server in the central location in an unencrypted format by uploading and storing separately the historic travel characteristics of each person. The students are advised that partaking in the neighborhood watch means that their location will be visible to the system's investigation teams when there is an investigation of a report of misconduct or other incident, and that they may be contacted by a system administrator if it appears that they may have been a witness to events and their observations may be helpful in making a determination as to what happened. They may be advised that members of the neighborhood watch who inform the system administrator that they did not see any relevant events will remain anonymous.

Figure 8:
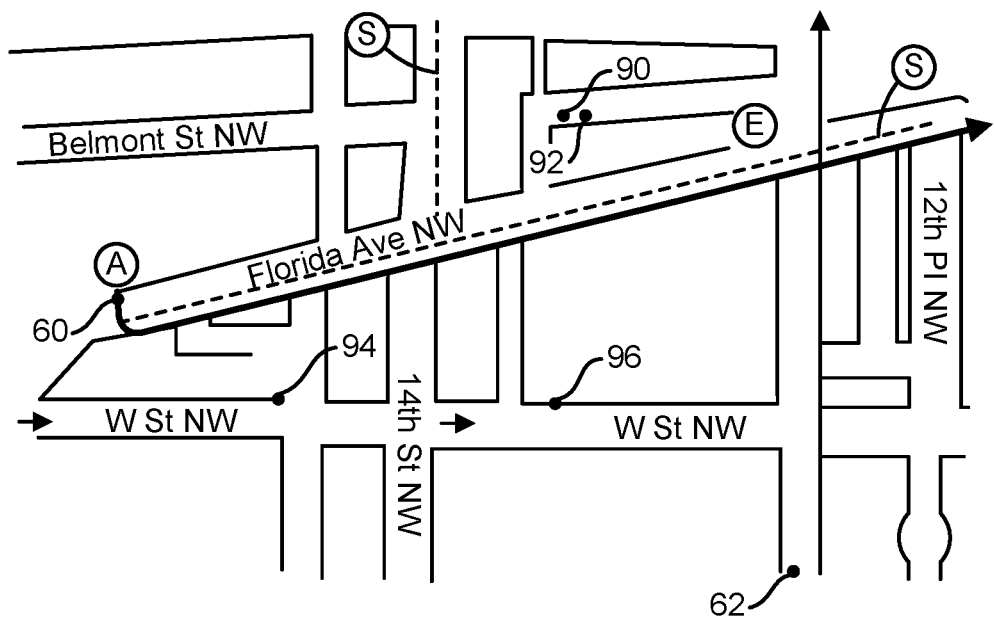
FIG. 8 is a close-up of the street map of FIG. 1, showing historic travel characteristics of persons near an incident location for use with one aspect of the method and system of the present invention.

If an administrator of the central location receives a report from a reporting person of an incident at a particular location and time of day, for example a fraternity house at location E in FIG. 8, the system may determine using an algorithm based on historic travel characteristics stored in the central location whether any historic travel characteristics of the plurality of people were near the incident location and time of day of the reporting person, and determine the identity of such person. This algorithm may employ locations and times to match person(s) whose historic travel characteristics were near the reported incident location and time of day.

The administrator may then contact the identified person(s) whose historic travel characteristics were near the incident location and time of day of the reporting person by the administrator to obtain recollection of time, events and locations of by the identified person relevant to the incident reported by the second person. The system administrator will be able to note, for example, that the victim was at a fraternity house E from 11:30-2:30 AM on a particular day. The system will be able to search stored GPS data available for that same location for that same time, and generate a list of users who were there or passed near location E, such as person 60 or person 62, who will then be sent requests for information concerning the events in question. These users can choose to submit statements and additional historic travel data or not.

The method and system of the present invention further permits multiple users to link their phones to create a dynamic boundary so that any user who strays from the rest of the group triggers an alert to the other members of the group—showing the current location of the errant user. In using the method of locating persons separated from the group, the group will comprise a plurality of people each having a mobile device containing system software with the capability of determining the person's travel characteristics such as identity, location and time of day. Each of the persons in the group will link their mobile device with each mobile devices of the people in the group, and establish a maximum separation distance of a mobile device from any of the mobile devices of each of the others in the group. For example, five students 70, 72, 74, and 76 as shown in FIG. 9a go out for the night and do not want to get separated, so they link their smartphones together and set a maximum safe distance of separation of 100 ft. from any other phone, which establishes the algorithm or rule to be used. As the evening progresses, the students as a group move to another location as shown in FIG. 9b, and each mobile device receives the time and current location of each other person in the group and measures the separation distance of each of the mobile devices of people in the group. If the separation distance of any mobile device of the plurality of people in the group as determined by the algorithm used exceeds the maximum separation distance from any other mobile device of the plurality of people in the group, the system on the separated person's mobile device and/or the remaining group's mobile devices sends a notification to the mobile devices of the identity and location of the person having the mobile device exceeding the maximum separation distance. In the example given, if student 74's phone registers their location as being more than 100 ft. from any other student's phone as shown in FIG. 9c, the remaining members 70, 72, 76 and 78 of the group get an alert with the current location of the stray phone 74, and optionally stray phone 74 creates its own alert. Any one of students 70, 72, 76 and 78 in the group may then initiate a phone call to that stray phone through selecting an option on the application, e.g., a "CALL" button will pop up with the alert that the phone is outside of the distance. The group will continue to track the location of the stray phone 74 until it comes back into the safe zone within the maximum separation distance, or the errant user deactivates the feature. If any member of the plurality of people in the group's battery dies or their phone loses GPS connection for any reason, the group may be sent an alert that the signal was lost from a specific phone, and the last known location will be sent to the group. No alerts may be sent to anyone outside of the group, unless specifically activated. Thus, students will be able to link their phones with their friends' phones in order to ensure that they are aware of their friend's current location and to get alerts if any friend goes outside of the designated safe distance.

The method and system of the present invention may also permit users to designate a safety zone at a particular geographical location, e.g. a house, restaurant, or tavern, and send an alert to their designated emergency contacts. In one aspect, the system automatically notifies the designated emergency contacts if the student user leaves the designated area. In another aspect, the system aids in determining arrival of a student at a designated location at time of day. In this aspect, a group of students each have mobile devices with a system software capable of determining travel characteristics comprising identity, location and time of day of the person having the mobile device. Each person in the group designates an entity, i.e., the identity of at least one other person in the group and optionally another contact for notification in emergencies. When a student is expected to travel to another location, for example student 80 traveling to dorm or home A in FIG. 10, the student establishes boundaries of that location and the time of day of expected arrival which are used by the algorithm. As the student travels to the designated other location, the system software on the student's mobile device receives current travel characteristics of the current location and time. The student's system software employs an algorithm which continually compares the current location and time with the boundaries of the selected other location and time of day of expected arrival, for example the student at subsequent times and locations 80$a$, 80$b$, 80$c$. If the received current travel characteristics are outside of the selected location's boundaries and time of expected arrival and the student does not reach home A by expected time and location 80$d$, the system software on the student's mobile device sends a notification to the designated entity.

If the student user does not arrive within the designated zone or boundary within the time allowed, or if their battery dies before they reach that zone, their phone may send an alert to their emergency contact list with their current/last known GPS location. The student user may also get a warning when they have only a limited number of minutes left on their timer, and have the option to extend the timer by additional time intervals through the system software on the mobile device. The student user can create a regular list of emergency contacts that is saved on their phone and which they can use by designating the entire list, or they can create a manual list for this specific use by designating new or additional emergency contacts from a menu of student accounts. If they designate a new student account that is not part of their emergency contact list, the new account will need to acknowledge/accept the request to be an emergency contact. The student may also have the option of designating campus security as an emergency contact. The emergency contacts will get an alert on their phones that the identified student has not arrived at the safe zone in the allotted time, and give them the option to call or text that person. The user can also set the system to send text message containing a URL link to a phone number and the system will automatically initiate the text to that number from the phone. The URL in the text provides a web-based platform, maintained independently of the mobile software application, hosted from the central location, and which allows non-users of the mobile application to view the student user's current location via the web-hosted software. The user may have the ability to designate the campus security person as the safety contact.

Alternatively, the student user may enter an anticipated time of arrival at a safe location, such as dorm or home A, or an anticipated time to reach or maintain a safe personal condition, e.g. 15 minutes. If the student is walking home from a tavern alone and does not arrive at a safe location or maintain themselves in a safe condition within the 15 minutes allocated, an alert is sent to their emergency contacts displaying their current location and providing their emergency contacts 1-touch call/text capability. This countdown timer may be manually deactivated, rather than be deactivated by entering a designated a geosafe zone or boundary. The user sets the timer and then starts it when they start walking home. If they do not deactivate it before the timer runs out, the student may get an alert with an option to extend the timer, and if not extended the system sends their emergency contact list an alert as to their current location. This system may also be used as a transportation safety backup, wherein students can use this capability to set their transportation, e.g., Uber/Lyft rideshare, destination and an anticipated time of arrival. If the driver doesn't bring them home within the time allocated, their emergency contacts receive an alert with the current GPS location and a 1-touch call/text option. An alternative is that a student user can have the system send a notification to the user's mobile device at periodic, specified intervals, which notification needs to be acknowledged, for example, by taping the device screen each time the notification is received to prevent the mobile device from sending out notification to an emergency contact.

For any student for whom the provision of current, real-time location information is activate, the system has the capability to send out an emergency alert to all students within a designated boundary or zone, such as within the area of the school's campus or any limited part thereof S indicated by the boundary line in FIG. 8. This may be restricted to emergencies that require a real time response, such as an active shooter, a fire, or other emergency. The system administrator may have the ability to send an emergency alert to those phones in a specific area, such as the area of school S, without needing or even having the ability to see which students are in what area. The administrator may merely receive the user identification number for the student 90, 92 accounts that are logged on in those specified areas. Optionally, if there is an active shooter or other emergency in a specified location, the phones or other mobile devices that are active in that area may receive a silent alert to shelter in place or to get out of that area, or similarly tailored geo-specific alert. Students with mobile devices that are active on campus outside of that specific area such as students 94, 96 may receive an alert that there is an emergency in a specific location and advice to stay away, or similarly tailored geo-specific alert.

The system may automatically generate maps of existing and resolved cases of incidents. These maps include the totality of information identified and reported to the system administrator, as well as the automated analysis and adaptive learning that the system administrator does. When cases are resolved, the system records the determination and logs the report for the system administrator which outlines the evidence and the basis for the findings in that particular case. The system then analyzes new cases and finds comparisons to old cases and recommends case handling activities, questions to ask, potential determinations, and recommended handling. It may also highlight potential problems to address, and generally creates a recommended roadmap for how to better work up the case.

The system may also use the case analytics to generate recommendations for the school. For example, the system may identify some types of behaviors or issues that are common in the field, and would assess how other schools have worked to avoid these, and the relative success of those approaches. The system could then generate recommendations for the school—either by way of improved training or orientation procedures, or better enforcement or policing behaviors. These recommendations would be supported by specifics and analytics. For example, school "X" was experiencing similar issues with fraternity parties during the first two weeks of school being a common location for sexual assault involving freshmen students by upperclassmen. School "X" implemented a policy of working with the heads of the fraternity houses prior to the start of the school year to address this issue, and saw a 37% reduction in cases. The system has the ability to assess these solutions from other schools and make such recommendations to schools.

The data and other information received by the student's mobile device as described herein, including the GPS data and other travel characteristics, audio and video data and times, may be sent via otherwise conventional methods to a central location such as a cloud server administered by the entity operating the systems herein. Such data and other information may be normally maintained in such server, and stored for limited periods of time, for example, one year. Such data and other information may be initially stored only on the student's mobile device and encrypted through the student's password, as a first level of encryption. If and when the student enters that first decryption code the student's data is released to the system administrator in an encrypted format and such encrypted data may be automatically or manually uploaded and stored on server at the central location of the system. The first decryption code (password) is not available to the administrators of the system, and data in student's mobile device cannot be accessed without the decryption code or password being expressly supplied by the student to the system administrator(s). The student can change their password and the data will re-encrypt under the new password. However, if the student forgets their password and needs it to be reset, any data encrypted under the old password may remain encrypted under that password and cannot be accessed by anyone without the original password being entered. The inability to access and receive data by the system administrator(s) without the student's password being entered creates Fifth Amendment protections around accessibility to this information, even in the event of a search warrant. The second layer of encryption occurs when the data is uploaded to the system cloud server at the central location. If the data and information sought by a system administrator in connection with a claim involving the student and their data that was received and recorded, the administrator must supply the password so that the second layer decryption is preformed to make the data visible to the administrator within the system and any authorized users within the system administrator In the event that a student has an active safety feature activated and the mobile device drops below a specific battery level (e.g. 10% battery), the device will advise the student that the feature will be disabled to preserve battery life and give them an option to keep it running or disable it. If the student chooses not to keep it running, then the feature may send a non-emergency alert to the student's emergency contacts, for example, those currently selected in whatever active safety feature the student is using. The non-emergency alert may be accompanied by the student's current GPS location and a message that their battery was running low and the function was consequently disabled.

An embodiment of the system and method of the present invention may take the form of a hardware embodiment that uses software (including firmware, resident software, microcode, etc.). Furthermore, an embodiment may take the form of a computer program product on a tangible computer-usable storage medium having computer-usable program code embodied in the medium. A memory device or memory portion of a computer-based device can form the medium. Computer program code or firmware to carry out an embodiment of the present disclosure could also reside on optical or magnetic storage media, especially while being transported or stored prior to or incident to the loading of the computer program code or firmware into the device. This computer program code or firmware can be loaded, as an example, by connecting a computer system to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module," "system," or "processor" configured to practice the method(s) or system(s) of the invention. The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as React Native, Java, Scala, Ruby, Python, Smalltalk, C++ or the like and conventional procedural programming languages such as the "C" programming language or similar programming languages. The method steps may be performed and the program code may execute entirely on the central location's computing device (such as a general purpose computer), partly on the central location's computing device, as a stand-alone software package, partly on the central location's computer device and partly on a remote computing device used by the student or other person (such as a mobile or smart phone, smart watch, smart bracelet or other mobile device) or entirely on the student's or other person's remote computing device. In the latter scenario, the person's remote computing device may be connected to another remote computing device and/or the system's central computing device through any type of network, including Bluetooth, a local area network (LAN), a wide area network (WAN), or a wireless local area network (WLAN), or the connection may be made to an external computing device (for example, through the Internet using an Internet Service Provider).

The methods of operation of the present invention may be implemented by computer program instructions. These computer program instructions may be provided to a processor of a general purpose computing device (such as, a computer), special purpose computing device, or other programmable data processor or processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart of FIG. 1.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in a flowchart of FIG. 1.

Thus, the present invention provides one or more of the following advantages: 1) an improved method of monitoring and assessing travel characteristics of a person that may assess via an algorithm the degree of deviation from the historic travel characteristics of the person, and send a notification to the person or a designated entity if the deviation is above a predetermined maximum; 2) an improved method of monitoring emergency situations of a person by determining if the person speaks a key emergency phrase, and record audio and/or video near the person along with time and location data of the person, and send a notification to a designated entity; 3) an improved method of identifying persons whose historic travel characteristics were near an identified incident location and time of day and contacting such person to obtain recollection of time, events and locations of by the identified person relevant to the incident; 4) an improved method of locating persons separated from a group by measuring separation distance of any single person and determining if the separation exceeds a maximum distance from any other person in the group, and sending out notification concerning the separated person; 5) an improved method of determining arrival of a person at a designated location at time of day by determining if the person is outside of the boundaries of the selected location and time, and sending notification concerning the person and/or 6) an improved method of determining quality of recollection of time, events and locations of a person by assessing via an algorithm deviation of the accuracy of the person's recollection of travel history compared to objective reports of the person's travel history. The present invention provides a network that may operate across multiple institutions, and implements a consistent set of rules, procedures and capabilities. The software-based data and evidence preservation, collection and submission coordinates a smartphone's existing functions (GPS, social media, texting, calling, etc.) into a location-monitoring and reporting system that operates at speed and efficiency, while permitting students to retain 100% control over their information. The proactive and preventative approach in the system and method of the present invention mitigates the effects of time latency in the identification of location and other collected information and helps to prevent students from becoming victims in the first place.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of monitoring and assessing travel characteristics of a person comprising:
    providing historic travel characteristics of a person comprising locations frequented, average travel speed, frequency of change of direction and patterns of travel activity at time of day;
    establishing for the person a maximum desired degree of deviation from the historic travel characteristics of the person over a period of time, the maximum desired degree of deviation from the historic travel characteristics being based on parameters selected from the group consisting of time of day, geographical location and distance from frequented locations;
    determining time of day of travel of the person;
    receiving travel characteristics of the person over a predetermined period of time inclusive of time of day of travel of the person;
    comparing the received travel characteristics of the person over the predetermined period of time with the historic travel characteristics of the person;
    determining degree of deviation of the received travel characteristics of the person over the predetermined period of time from the historic travel characteristics of the person; and
    if the received travel characteristics of the person over the predetermined period of time is over the maximum established degree of deviation from the historic travel characteristics of the person, sending a notification to the person or a designated entity.

2. The method of claim 1 further including:
    if the received travel characteristics of the person over the predetermined period of time is not over the maximum established degree of deviation from the historic travel characteristics of the person, receiving travel characteristics of the person over an additional period of time; and
    continuing reception of travel characteristics of the person over an additional period of time until the person reaches a frequented location.

3. The method of claim 1 further including, if the received travel characteristics of the person over the predetermined period of time is over the maximum established degree of deviation from the historic travel characteristics of the person, sending to the person a recommended geographical path of travel to a frequented location.

4. A method of determining quality of recollection of time, events and locations of a person comprising:
- receiving a report by a person of recollection of travel history comprising locations frequented, location characteristics and events at time of day;
- determining objective travel history information of the person selected from the group consisting of objective reports of the locations frequented, the location characteristics and events at the time of day;
- establishing for the person a degree of deviation of the recollection of travel history by comparing parameters of the person's report of recollection of travel history with parameters of the objective reports of the travel history of the person;
- identifying a maximum degree of deviation between the parameters of the person's report of the recollection of the travel history with the parameters of the objective reports of the travel history of the person; and
- using the maximum degree of deviation identified, determining a deviation assessment of the accuracy of the person's recollection of travel history compared to the objective reports of the person's travel history.

5. The method of claim 4 further including:
- creating a first map of specific parameters in the report of the person's recollection of travel history;
- creating a second map of specific parameters in the objective reports of the person's travel history;
- comparing the specific parameters in the first map with comparable specific parameters in the second map to determine degree of deviation of each specific parameter; and
- using the determined degree of deviation of each specific parameter to determine the deviation assessment.

6. The method of claim 5 further including assigning a deviation assessment degree of truthfulness or recollection of each specific parameter.

7. The method of claim 6 further including determining a general deviation assessment based on all of the determined degrees of deviation of each specific parameter.

8. The method of claim 4 wherein degree of deviation of each specific parameter is determined by comparing the specific parameter in the first map with a comparable specific parameter in the second map, and assigning a deviation based on accuracy of the person's claim of recollection or claim of lack of recognition compared to the specific parameter in the objective reports of the person's travel history in the second map.

9. The method of claim 8 further including evaluating degree of deviation of specific parameters based on accuracy of the person's claim of adequate or good recollection compared to the specific parameter in the objective reports of the person's travel history in the second map.

10. The method of claim 8 further including evaluating degree of deviation of specific parameters based on accuracy of the person's claim of lack of recollection compared to the specific parameter in the objective reports of the person's travel history in the second map.

11. The method of claim 8 wherein degree of deviation of each specific parameter is additionally determined by applying a weighting factor based on significance of time, events and/or locations in the person's recollection of travel history.

12. The method of claim 8 wherein degree of deviation of each specific parameter is reduced to a numerical value to determine degree of deviation.

13. The method of claim 4 further including:
- collecting an additional report of recollection of travel history by the person regarding the parameter of maximum deviation from the objective reports of the travel history of the person.

14. A method of obtaining recollection of time, events and locations of a person comprising:
- receiving historic travel characteristics of a plurality of people comprising identity, locations frequented and patterns of travel activity at time of day of each person in the plurality;
- uploading and storing separately the historic travel characteristics of the each person in the plurality in a central location;
- receiving a report by an administrator of the central location from a reporting person of an incident at a location and time of day;
- determining from historic travel characteristics in the central location whether any historic travel characteristics of the plurality of people were near the incident location and the time of day of the reporting person;
- determining identity of the person whose historic travel characteristics were near the incident location and time of day of the reporting person;
- contacting the identified person whose historic travel characteristics were near the incident location and time of day of the reporting person by the administrator to obtain recollection of time, events and locations of by the identified person relevant to the incident reported by the second person.

15. A method of determining arrival of a person at a designated location at time of day comprising:
- providing a group comprising a plurality of people having mobile devices having capability of determining travel characteristics comprising identity, location and the time of day of the person having the mobile device;
- providing for each person in the group a designated entity comprising the identity of at least one other person in the group and optionally a third person;
- establishing boundaries of a selected designated location and time of day of expected arrival of a first person in the group;
- receiving current travel characteristics of the first person's mobile device comprising location and the time of day;
- comparing the received current travel characteristics of the first person with the established boundaries of the selected designated location and the time of day of the expected arrival of the first person;
- if the received current travel characteristics of the person is outside of the boundaries of the selected designated location and time of day of expected arrival of the first person, sending a notification from the first person to the designated entity.

16. The method of claim 15 wherein the notification consists of travel history and current location of the first person.

* * * * *

UNITED STATES PATENT AND TRADEMARK OFFICE
CERTIFICATE OF CORRECTION

PATENT NO. : 11,463,841 B1
APPLICATION NO. : 16/932932
DATED : October 4, 2022
INVENTOR(S) : Alex Romano It is certified that error appears in the above-identified patent and that said Letters Patent is hereby corrected as shown below:

In the Specification

Column 3, Line 41-42, change "specific: parameters" to "specific parameters"

Column 11, Line 31, change "Ai and Da" to "$A_1$ and $D_1$"

Column 11, Line 35, change "Ci" to "$C_1$"

Column 11, Line 42, change "Bi and Fi" to "$B_1$ and $F_1$"

Signed and Sealed this
Thirtieth Day of May, 2023

Katherine Kelly Vidal
*Director of the United States Patent and Trademark Office*